(12) United States Patent
Nelson, Jr.

(10) Patent No.: US 9,839,209 B2
(45) Date of Patent: Dec. 12, 2017

(54) SELF DISPENSING BAIT HOLDER

(75) Inventor: Mackie Nelson, Jr., Lamesa, TX (US)

(73) Assignee: BAITANATOR, INC., Lamesa, TX (US)

( * ) Notice: Subject to any disclaimer, the term of this patent is extended or adjusted under 35 U.S.C. 154(b) by 895 days.

(21) Appl. No.: 14/349,177

(22) PCT Filed: Sep. 13, 2012

(86) PCT No.: PCT/US2012/055080
§ 371 (c)(1),
(2), (4) Date: Apr. 2, 2014

(87) PCT Pub. No.: WO2013/052251
PCT Pub. Date: Apr. 11, 2013

(65) Prior Publication Data
US 2014/0245654 A1    Sep. 4, 2014

Related U.S. Application Data

(60) Provisional application No. 61/542,450, filed on Oct. 3, 2011.

(51) Int. Cl.
*A01K 83/06* (2006.01)
*A01K 97/04* (2006.01)

(52) U.S. Cl.
CPC .............. *A01K 83/06* (2013.01); *A01K 97/04* (2013.01)

(58) Field of Classification Search
CPC ......... A01K 83/06; A01K 83/02; A01K 83/00
See application file for complete search history.

(56) References Cited

U.S. PATENT DOCUMENTS

| | | | |
|---|---|---|---|
| 2,608,789 A | 2/1948 | Stone | |
| 2,564,216 A | 11/1948 | Stark | |
| 3,399,483 A * | 9/1968 | Naffziger | A01K 83/06 43/44.4 |
| 3,400,483 A | 9/1968 | Temple | |
| 3,643,366 A * | 2/1972 | Gates | A01K 97/24 43/17.2 |
| 4,015,359 A | 4/1977 | Andrews | |

(Continued)

FOREIGN PATENT DOCUMENTS

GB    2471341 A    12/2010

OTHER PUBLICATIONS

PCT/US2012/0055080 International Search Report/Written Opinion dated Dec. 7, 2012.

*Primary Examiner* — Christopher P Ellis
*Assistant Examiner* — Jessica Wong
(74) *Attorney, Agent, or Firm* — Edwin S. Flores; Daniel Chalker; Chalker Flores LLP

(57) ABSTRACT

A fishing bait holder, the holder having a rod for holding a plurality of pieces of bait, the rod having a first end and a second end, the first end having threads and the second end culminating in a fish hook; a washer through which the rod travels, the washer proximal to the hook and to the loaded bait; a spring superior to the washer and encircling the rod; a hollow cylindrical housing over the spring, the housing having a first closed end and a second open end, the first end having on the top of the exterior an orifice for attaching a fishing line and internally housing a nut into which the first end of the rod threads, the fishhook protruding out of the second open end.

14 Claims, 3 Drawing Sheets

(56) References Cited

U.S. PATENT DOCUMENTS

| | | |
|---|---|---|
| 4,047,320 A | 9/1977 | Lee |
| 4,428,146 A | 1/1984 | Walker |
| 4,760,665 A * | 8/1988 | Stueber .................. A01K 83/02 43/36 |
| 4,934,092 A | 6/1990 | Simmons et al. |
| 5,067,270 A | 11/1991 | Garrick |
| 5,117,571 A | 6/1992 | Sites |
| 5,377,445 A | 1/1995 | Brannon |
| 5,548,920 A | 8/1996 | Peddycoart |
| 6,012,247 A | 1/2000 | Kinsey |
| 6,138,400 A | 10/2000 | Gervae |
| 6,421,951 B1 | 7/2002 | Kuhl |
| 6,425,200 B1 * | 7/2002 | Bennis .................. A01K 93/00 43/44.87 |
| 6,438,892 B1 | 8/2002 | Oberman et al. |
| 6,625,920 B1 | 9/2003 | Rockwell |
| 8,161,678 B1 * | 4/2012 | DeLucca ................ A01K 93/02 43/17 |
| 2004/0016171 A1 | 1/2004 | Waxmanski |
| 2004/0093784 A1 | 5/2004 | Brahm et al. |
| 2006/0016118 A1 | 1/2006 | Zuk |
| 2011/0041381 A1 | 2/2011 | Houghton |
| 2012/0042468 A1 * | 2/2012 | Viles ..................... A01K 97/00 15/236.01 |

\* cited by examiner

SELF DISPENSING BAIT HOLDER

CROSS REFERENCE TO RELATED APPLICATIONS

This application claims the benefit of PCT/US2012/0055080 filed Sep. 13, 2012, which claimed priority to provisional patent application 61/542,450 filed Oct. 3, 2011 by the present inventor and these applications are hereto incorporated by reference in their entirety.

STATEMENT REGARDING FEDERALLY SPONSORED RESEARCH OR DEVELOPMENT

Not Applicable

NAMES OF PARTIES TO JOINT RESEARCH AGREEMENT

Not Applicable

REFERENCE TO SEQUENCE LISTING

Not Applicable

DESCRIPTION OF ATTACHED APPENDIX

Not Applicable

BACKGROUND OF THE DISCLOSED TECHNOLOGY

1. Field of the Invention

The disclosed relates generally to devices for holding and dispensing fish bait via a hook to catch the fish. More specifically, it relates to a device capable of storing multiple pieces of bait and dispensing each piece as needed to the fish hook.

2. Description of Related Art

The general concept is that it is time-consuming and inefficient to re-bait one's fishing hook every time a fish nibbles the bait off or the bait falls off in the water. With regard to dough bait or other types of bottom feeder bait, it is common for the bait to crumble off into the water or to be gently nibbled off by the fish. As a result, the fisherman must continually pull the fishing line in to check the status of the bait on the hook. This frequent disruption in the line placement decreases the likelihood of a fish biting, not to mention the process is tedious and frustrating. There appear to be no prior art references related to a device capable of storing multiple pieces of bait and self-dispensing each piece as needed to the fish hook, without the need for further intervention by the fisherman.

There is a need for a practical method and device such that a fisherman can avoid tedious and repetitive pulling in of the fishing line to check the status of and, if necessary, rebait the hook during fishing sessions. Such a method and device needs to be quick and easy to load bait on, sturdy enough to withstand the effects of fish and water, able to protect the multiple pieces of bait until needed and in a size and shape conducive to attracting and catching fish.

SUMMARY OF THE INVENTION

In accordance with the present invention, a device and method is disclosed for storing multiple pieces of fish bait and dispensing them on an as needed basis without further human intervention.

An objective of the disclosure is a device and method that prevents a fisherman from repetitively having to pull the fishing line in to check bait.

An objective of the disclosure is a device and method to enable a fisherman to leave his baited hook in the water continually, in order to improve odds of catching a fish.

An objective of the disclosure is a device and method for improving the odds of a fish biting the hook.

An objective of the disclosure is a device and method that releases an increased amount of scent to attract fish.

An objective of the disclosure is a bait holder to make it easier and less messy to bait a fishhook.

An objective of the disclosure is a bait holder that makes it less likely the bait will fall off in the water.

An objective of the disclosure is a bait holder that stores and protects multiple pieces of bait.

An objective of the disclosure is a bait holder that automatically dispenses fish bait to the hook as needed.

An objective of the disclosure is a novel fishhook, the fishhook having an elongated rod wherein the bait can be slid down over the top of the rod, rather than hooked onto or molded around the hook.

An objective of the disclosure is a fishing bait holder, the holder comprising:

a rod for holding a plurality of pieces of bait, the rod having a first and second end, the first end being threaded and the second end culminating in a fish hook; a washer through which the rod travels, the washer superior to the hook and to the loaded bait; a spring proximal to the washer and encircling the rod; a hollow cylindrical housing over the spring, the housing having a first closed end and a second open end, the first end having on the top of the exterior an orifice for attaching a fishing line and internally housing a nut into which the first end of the rod threads, the fishhook protruding out of the second open end.

An objective of the disclosure is a fishing bait holder, the holder comprising:

a spring release bait holder for holding a plurality of pieces of bait on a rod, the holder having a rod with a first end that is threaded and a second end culminating in a hook, the spring encircling the rod and deploying a new bait to the hook each time a bait on the hook is removed; a housing for protecting the multiple pieces of bait; a connector for securing the rod to the housing.

An objective of the disclosure is a fishing bait dispenser, the dispenser comprising: a spring loaded rod holding a plurality of pieces of fish bait and self-dispensing one at a time to a treble hook at one end of the rod; a housing having a first closed end and second open end, the housing surrounding the spring loaded rod superior to the hook; a connector securing the rod to the interior of the first closed end of the housing.

Other advantages of the present invention will become apparent from the following descriptions, taken in connection with the accompanying figures, wherein, by way of illustration and example, an embodiment of the present invention is disclosed.

BRIEF DESCRIPTION OF THE DRAWINGS

The figures constitute a part of this specification and include exemplary embodiments to the invention, which may be embodied in various forms. It is to be understood that in some instances various aspects of the invention may be shown exaggerated or enlarged to facilitate an understanding of the invention. To enable more thorough understanding of the features and advantages of the present invention, reference is now made to the detailed description of the invention along with the accompanying figures in which:

FIG. 1a is a front view of the housing, in the preferred embodiment.

DETAILED DESCRIPTION OF THE PREFERRED EMBODIMENTS

Figure 1:
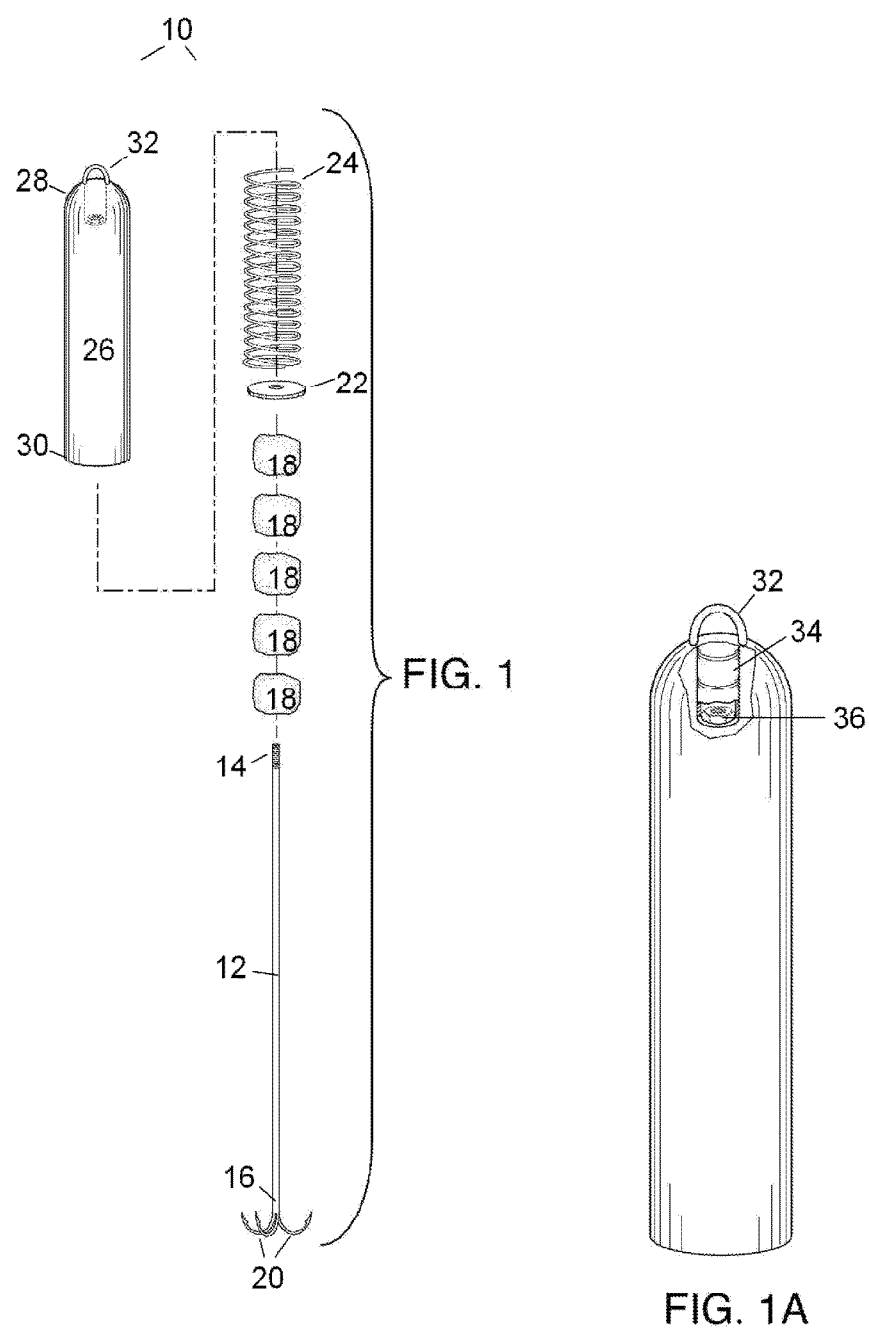
FIG. 1 is a front exploded view of the components of the disclosed fishhook, in the preferred embodiment, the bait being shown in its state prior to being loaded.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The disclosed enables a fisherman to preload the bait holder with multiple servings of bait. This fishhook resides at the bottom end of an elongated center rod which is preloaded with multiple servings of bait. The center rod is surrounded by a housing that protects the preloaded bait until time for use. The device is designed such that as the piece of bait lowest on the hook is removed, the next piece of bait self-dispenses by sliding down the center rod into place, for ready access by fish. The bait may be predrilled with a hole for easily loading onto the top end of the center rod, however this is not necessary if the dimension of the rod is small enough that it can easily slide through the bait without causing it to fall apart. The rod in the preferred embodiment is a #6 diameter (approximately 0.138" diameter) although it may be of varying sizes provided the same objectives described herein are accomplished. The device and method is intended to be used with treble hooks, such as those used when fishing for catfish and other large mouth bottom dwellers, but may be incorporated for use with other types of hooks, such as a single hook especially for use with live bait such as shrimp.

Historically, when using treble hooks for large mouth fish, the fisherman forms a dough ball around the shank of the hook, working it down closer to the bend of the three hooks. This method has been traditionally problematic as pieces of the hard dough bait easily crumble off in the water after the dough bait is molded it onto the hook. Once the dough ball falls off or is nibbled off by the fish, the fisherman must reel the line in and rebait. Even worse, the fisherman has previously had no way of knowing when the dough bait has actually fallen off and consequently may have his line in the water for a great length of time with no bait on the hook. The need to frequently pull the line in and check the bait means less time that the baited hook is in the water, and a lesser chance that a fish will be caught. In tournament settings, time is of the essence, and having to continually pull a line in to check and rebait can be hugely detrimental. Additionally, the repetitive motion of reeling the line in and recasting may scare the nearby fish away.

The disclosed device and method solves this problem. There are significant advantages to a device that enables the fisherman to cast once and then leave the baited hook in one area of the water for an extended period of time. One unforeseen advantage of the disclosed fish hook is that the self dispensing aspect encourages a nibbling fish to continue nibbling on and around the hook, even after the first piece of bait has fallen off or been nibbled away. The longer a fish stays in the vicinity of the hook, the higher the odds that it will bite and be caught.

Because of the necessity of a housing to protect the surplus bait prior to each piece self-dispensing downwardly to the hook, additional surprising advantages are gained. The ability of the device to store a large amount of bait results in a greater volume of bait scent being released into the surrounding water, further enticing nearby fish. In an embodiment, the housing may have small holes drilled in the side of the housing cylinder to more dramatically release the bait smell.

Turning to the illustrations, as exhibited in FIG. 1, in a preferred embodiment, the disclosed device 10 is pictured in an exploded view in order that the components and bait may be readily viewed. Pictured is a vertical elongated center rod 12 having a top end 14 and a bottom end 16, the rod 12 having the purpose of holding a plurality of pieces of bait 18. The fishhook 20, here shown as a treble hook, is located at the bottom end 16 of the center rod 12. The fishhook is novel in that it incorporates the elongated vertical rod and that it does not have the traditionally known eyehole at the top that the fishing line would thread through. The rod 12 and the fishhook 20 may be a one piece component or the fishhook 20 may be permanently or removably affixed to the bottom end 16 of the rod 12.

In practice, the bait 18 is loaded onto the rod 12 by the fisherman, by sliding the center point of each piece of bait 18 over the top end 14 of the rod 12. Next, the washer 22 slides over the top end 14 of the rod 12 and rests on the top most piece of bait 18. The spring 24 next is dropped down over the top end 14 of the rod 12 and sits superior to the washer 22. A hollow cylindrical housing 26 having a closed first end 28 and an open second end 30 next slides over the spring 24, washer 22 and pre-loaded bait 18, protecting the bait. In the preferred embodiment, the fish hook 20 itself is not covered by the housing, rather extending below the housing 26 to enable the fish hook 20 and at least one piece of bait 18 to be accessible, outside of the housing 26, to a biting fish.

Projecting from the exterior of the closed first end 28 of the housing 26 is an arch 32 or an orifice through which a fishing line may be tied to secure the device 10 to the line.

FIG. 1a provides a cutaway of the interior of the closed first end 28 of the housing 26 showing a hollow cylinder 34 having inside it a barrel nut 36.

In practice the top end 14 of the rod 12 is threaded. After pre-loading the pieces of bait on the rod and dropping the washer, spring and housing over the rod, the fisherman would next insert the threaded top end 14 of the rod 12 into the barrel nut 36, turning the fish hook or the rod until the top end 14 of the rod 12 is securely screwed into the barrel nut 36, which holds the spring loaded rod assembly and bait securely in the protective housing 26.

The fisherman would next pass one end of his fishing line through the arch 32 or orifice on the exterior of the closed first end 28 of the housing 26 and tie it securely, prior to casting out his line to commence fishing.

Figure 2:
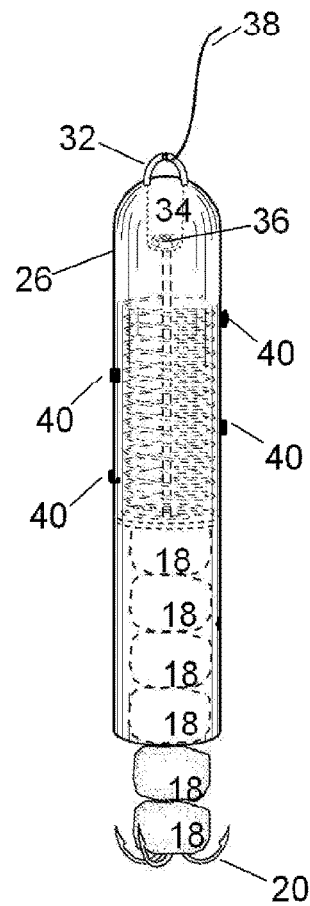
FIG. 2 is a close up perspective view of the disclosed fishhook in the preferred embodiment, with the bait pre-loaded.

In FIG. 2, is a close up perspective view of the device 10 assembled as described above, revealing the interior components in phantom. FIG. 2 reveals the fishing line 38 tied to the arch 32. FIG. 2 also reveals the embodiment of a plurality of drilled holes 40 in the housing 26, above the washer 22, in order to encourage the device 10 to take on water such that it will sink easier. The holes may also release more of the bait scent out to surrounding fish and entice them closer, especially if additional holes are drilled below the washer.

Figure 3:
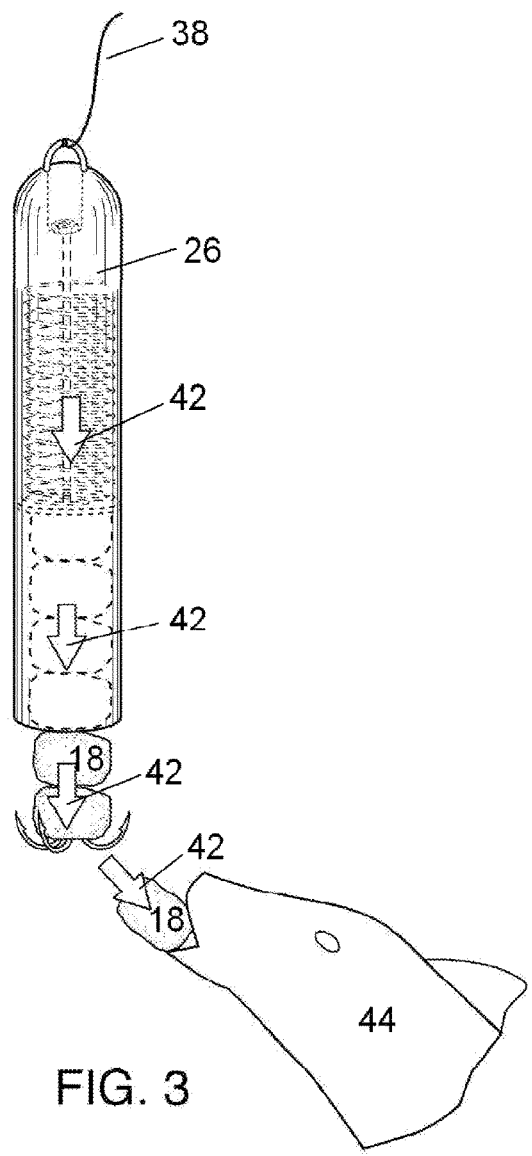
FIG. 3 is a close up perspective view of the disclosed fishhook, in the preferred embodiment, showing the dispensing action.

FIG. 3 depicts the same view as FIG. 2 however FIG. 3 also depicts the self-dispensing action 42 of the device 10 as effectuated in the water. The bait 18 is preloaded onto the rod 12 with the bottom most piece being held by the treble hook 20. The remaining pieces are stacked atop one another on the rod 12. Above the last piece of bait rests the washer 22, above which presses down the spring 24 which has been compacted upwards by the loading of the bait 18. Because the spring 24 is compacted due to the plurality of pieces of pre-loaded bait 18 pushing it upwards, after the bottom most piece of bait falls or is eaten off by a fish 44, the next piece of bait is pushed down by the spring 24, into place on the treble hook 20, and so forth, until all of the bait 18 has been dispensed or a fish has been caught, whichever occurs first.

Figure 4:
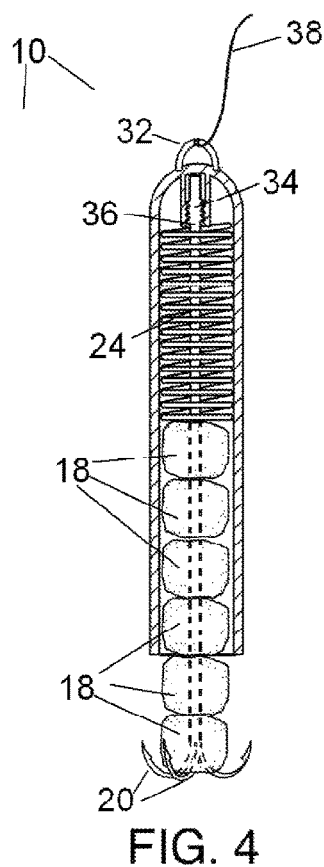
FIG. 4 is a close up sectional view of the disclosed fishhook, in the preferred embodiment, with the bait pre-loaded.

FIG. 4 depicts a sectional view of the device 10, showing more clearly the interior components of the device 10 with the housing protecting the majority of the bait 18 and spring 24 while the fish hook 20 projects down below and outside of the open second end 30 of the housing 26.

Figure 5:
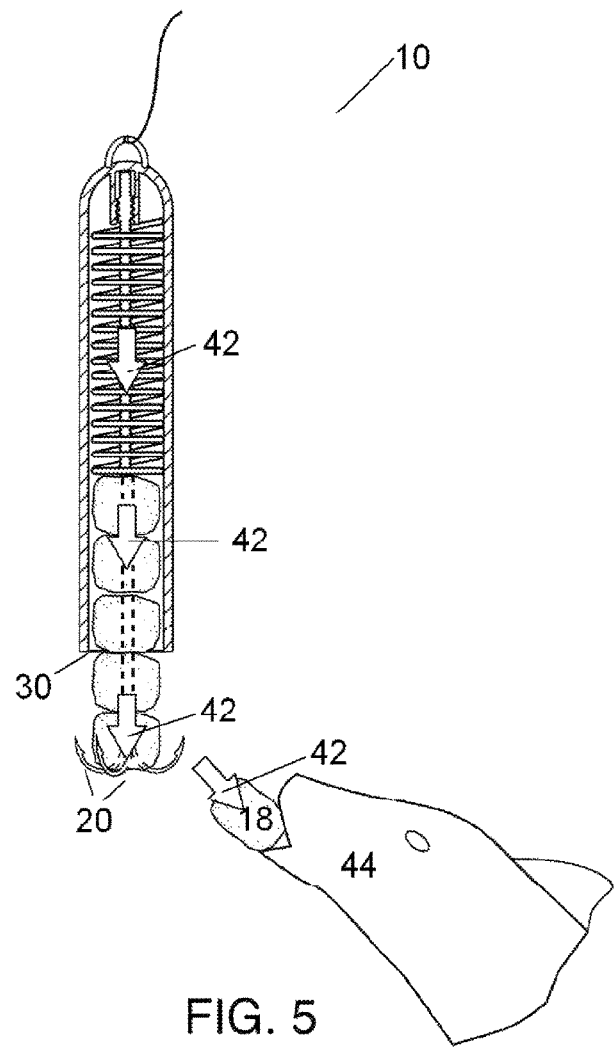
FIG. 5 is a close up sectional view of the disclosed fishhook, in its preferred embodiment, showing the dispensing action.

FIG. 5 depicts a sectional view of the device 10, showing more clearly the interior components of the device 10 and the dispensing action of the self-dispensing bait.

An additional benefit of the disclosed is that the device is much easier and less messy to bait with dough bait, than a traditional fishhook. Typically the way one places dough bait on a fish hook is to carefully mold the bait around and onto the hook with one's hands. There are numerous disadvantages with this method. One, it is difficult to mold the hard dough bait onto the hook. Two, the bait can easily fall off once it is molded on. Three, it is messy. Four, the user could easily injure themselves by having to use their bare hand to push the bait onto and around a treble or single hook.

The disclosed device is loaded by merely sliding each piece of bait from the top downwardly on the elongated center rod, preventing the user from needing to physically mold the bait onto the hook. Once the bait has dropped down to the hook, it sits more securely, as it is held inside or on the tines of the hook rather than being molded around the outside of the hook. It is less likely to fall off in the water. It is safer, easier and less messy to bait the hook.

The way traditional fishhooks are made, there is no way to slide bait over the top of them as the top of the fishhook typically has a wide eyehole through which the fishing line threads. The eyehole is too wide to push a piece of bait over. The disclosed is novel in that the fishhook rod itself has no built in eye at the top, and therefore a piece of bait can be slid downwardly from the top of the rod, rather than to be molded over or hooked onto the fishhook itself.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

It is to be understood that the embodiments disclosed herein are shown for illustrative purposes and are not intended to be construed as limitations of the disclosed method and system. Those skilled in the art will recognize or be able to ascertain in the course of routine experimentation, that variations and equivalents of the embodiments may be undertaken without departing from the scope of the invention.

Certain terms are used throughout the description to refer to particular method components. As one skilled in the art will appreciate, design and manufacturing companies may refer to a component by different names. This document does not intend to distinguish between components that differ in name but not function.

The terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other intermediate devices and connections. Moreover, the term "method" means "one or more components" combined together. Thus, a method can comprise an "entire method" or "sub methods" within the method.

The use of the word "a" or "an" when used in conjunction with the word "comprising" may mean "one", or may also mean "one or more." The use of the term "or" in the claims is used to mean "and/or" unless explicitly indicated to refer to alternatives only or the alternatives are mutually exclusive, although the disclosures supports a definition that refers to only alternatives and "and/or."

The methods and systems disclosed and claimed herein can be made and executed without undue experimentation based on the level of disclosure presented. While the methods and systems have been described in terms of their preferred embodiments, it will be apparent to those skilled in the art that they are not limited to the exact steps described and may vary from such description without departing from the scope and spirit of the invention. The substitutes and modifications employed by one skilled in the art are deemed to fall within the scope of the invention.

What is claimed is:

1. A fishing bait holder, the holder comprising:
   a rod for holding a plurality of pieces of bait, the rod having a first and second end, the first end having threads and the second end culminating in a fish hook;
   a washer through which the rod travels, the washer proximal to the hook and to the loaded bait;
   a spring superior to the washer and encircling the rod;
   a hollow cylindrical housing over the spring, the housing having a first closed end and a second open end, the first end having on the top of the exterior an orifice for attaching a fishing line and internally housing a nut into which the first end of the rod threads, the fishhook protruding out of the second open end.

2. The bait holder of claim 1 wherein the nut is a barrel nut.

3. The bait holder of claim 1 wherein the fish hook is a treble fish hook.

4. The bait holder of claim 1 wherein the bait is dough bait.

5. The bait holder of claim 1 wherein the bait is shrimp.

6. A fishing bait holder, the holder comprising:
a spring release bait holder housing for holding a plurality of pieces of bait on a rod, wherein the rod has a first end that is threaded and a second end culminating in a hook,
a spring within the housing encircling the rod and deploying a new bait to the hook each time a bait on the hook is removed; and
a connector for securing the rod to the housing.

7. The bait holder of claim 6 wherein the connector is a barrel nut.

8. The bait holder of claim 6 wherein the fish hook is a treble fish hook.

9. The bait holder of claim 6 wherein the bait is dough bait.

10. The bait holder of claim 6 wherein the bait is shrimp.

11. A fishing bait dispenser, the dispenser comprising:
a spring loaded rod holding a plurality of pieces of fish bait and self-dispensing one at a time to a treble hook at one end of the rod;
a housing having a first closed end and second open end, the housing surrounding the spring loaded rod superior to the hook;
a connector securing the rod to the interior of the first closed end of the housing.

12. The dispenser of claim 11 wherein the spring loaded rod further has a washer superior to the fish bait.

13. The dispenser of claim 11 wherein the connector is a barrel nut.

14. The dispenser of claim 11 further having an orifice at the top of the housing for attaching a fishing line.

\* \* \* \* \*